United States Patent Office 3,201,214
Patented Aug. 17, 1965

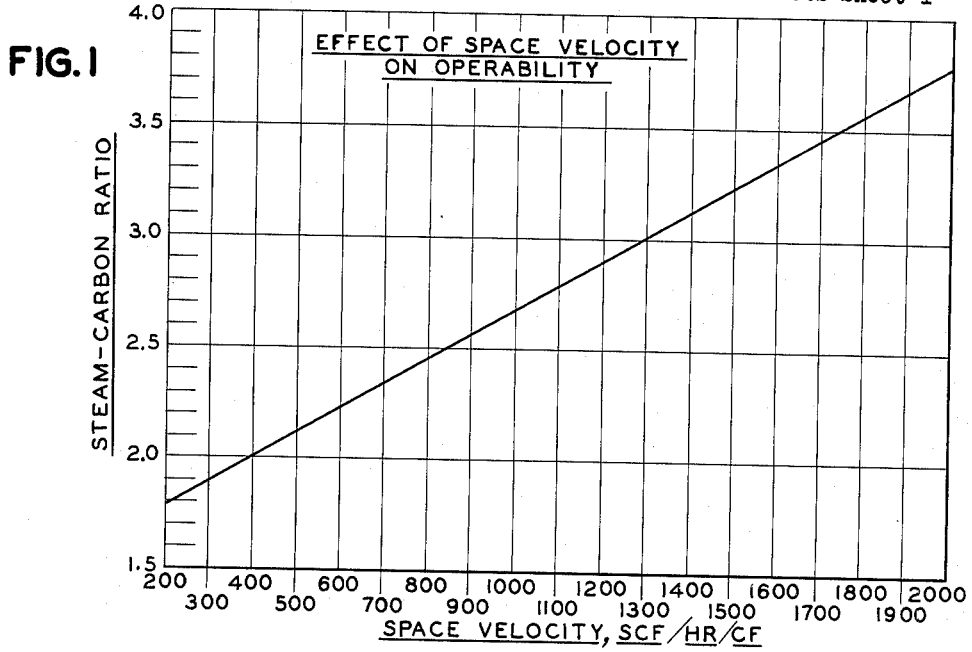
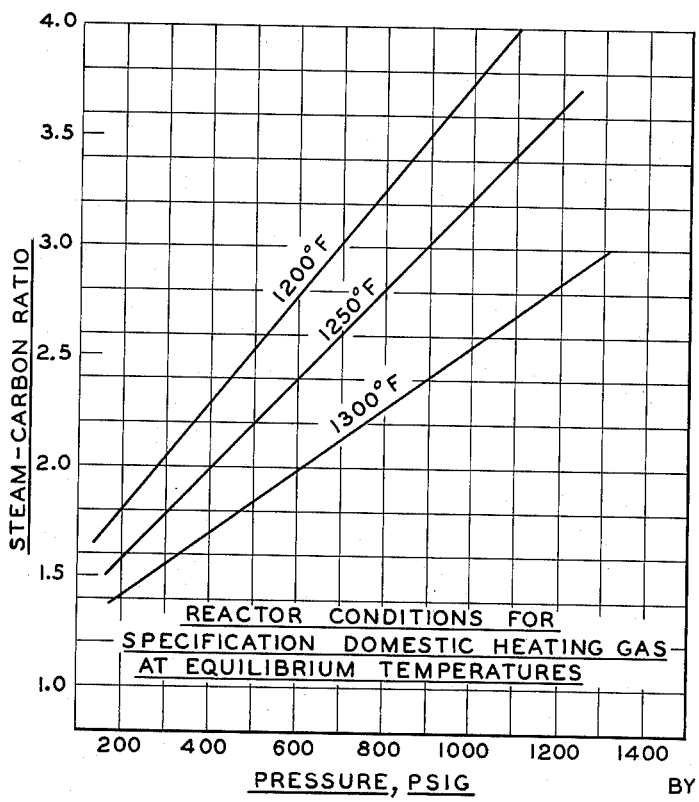

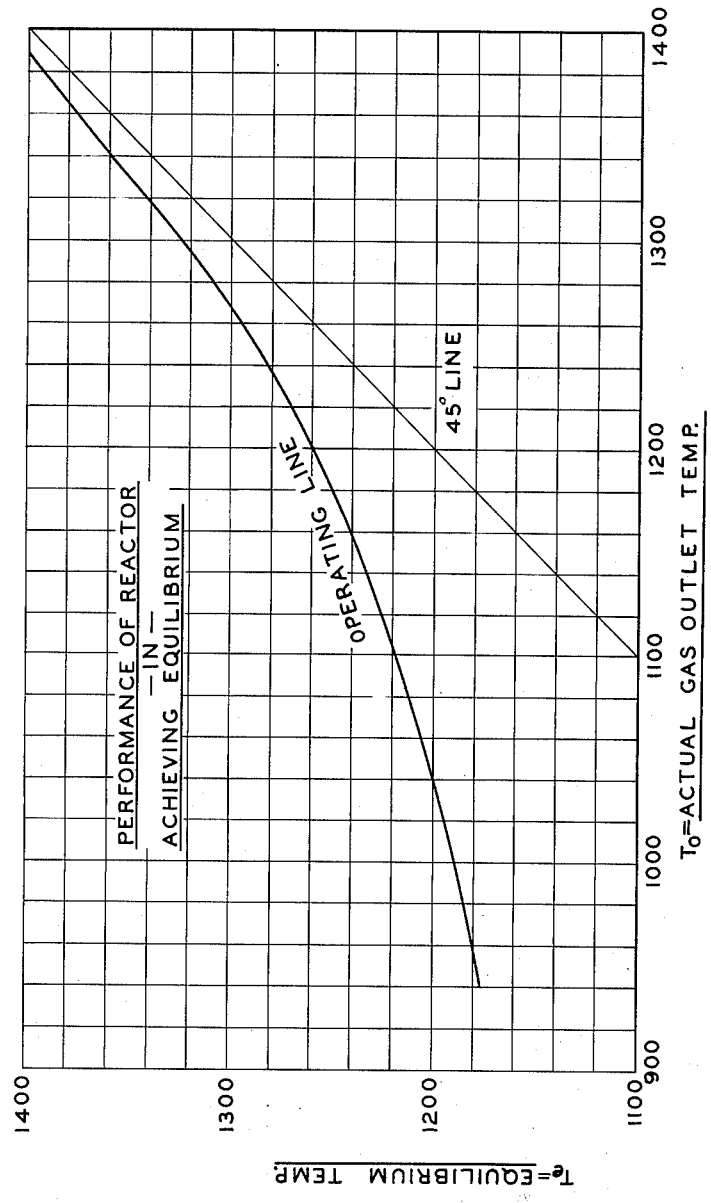

3,201,214
PRODUCTION OF DOMESTIC HEATING GAS
Joseph M. Fox 3rd, Green Village, and Joseph C. Yarze, Union, N.J., assignors to Pullman Incorporated, a corporation of Delaware
Filed Feb. 1, 1963, Ser. No. 255,579
8 Claims. (Cl. 48—214)

This invention relates to the production of domestic heating gas and, more particularly, to a method for converting napththa to domestic heating gas in a single conversion step.

Safe and satisfactory performance of the gas appliances in a given geographical area requires that the domestic heating gas supplied have very specific combustion characteristics. The most important properties of the gas in this connection are the heating value, the specific gravity, and the burning velocity. Burning velocity is confined within narrow limits in order to prevent incomplete combustion, lifting of the flame off the burner or lighting back of the flame. The heating value of the gas depends most heavily on the hydrocarbon content. The specific gravity of the gas depends upon the entire gas composition. Burning velocity is largely dependent upon hydrogen content. A limitation on carbon monoxide content is usually imposed to limit toxicity. A typical set of specifications for a domestic heating gas are as follows:

Heating value, B.t.u./s.c.f. _____ 500
Specific gravity (Air=1) _____ 0.47
$H_2$, mol percent _____ 45–50
Maximum CO, mol percent _____ 5

With these specifications, the resulting gas composition is automatically restricted to an extremely small range, as shown by the following calculation.

To meet the heating value specification:

|  | Mol Percent | Heating Value, B.t.u./s.c.f. |
|---|---|---|
| $H_2$ | 45–50 | 146–162 |
| CO | 5 | 16 |
| Inerts ($CO_2$, $N_2$, A) | [1] 17–13 | |
| $CH_4$ | 33–32 | [1] 338–322 |
|  | 100 | 500 |

[1] By difference.

Then, to meet the specific gravity specification:

|  | Mol Percent | Molecular Weight |
|---|---|---|
| $H_2$ | 45–50 | 0.9–1.0 |
| CO | 5 | 1.4 |
| Inerts ($CO_2$, $N_2$, A) | 17–13 | [1] 6.05–6.11 |
| $CH_4$ | 33–32 | 5.28–5.12 |
|  | 100 | 13.63 |

[1] By difference.

The total molecular weight of 13.63 which is required is found by multiplying the specific gravity sought (0.47) by the molecular weight of air (29). As the data show, the molecular weight of the inerts must be 36–47 indicating that $CO_2$ must constitute a major part of the 17–13 mol percent.

There is some variation from area to area in the specifications for domestic heating gas, so that the foregoing composition is not definitive of all domestic heating gas compositions. However, the basic properties of heating value, specific gravity and burning velocity will not vary greatly from the typical values given. Hence, the gas composition illustrated accurately reflects the order of magnitude of the concentrations of the constituents.

It has been proposed to prepare domestic heating gas from liquid hydrocarbons. The feed stock is vaporized and reacted with steam in the presence of steam reforming catalyst. The net principal reactions involved may be illustrated for heptane by Equations 1, 2 and 3 as follows:

(1) $\quad C_7H_{16}+7H_2O=7CO+15H_2$
(2) $\quad CO+3H_2=CH_4+H_2O$
(3) $\quad CO+H_2O=CO_2+H_2$

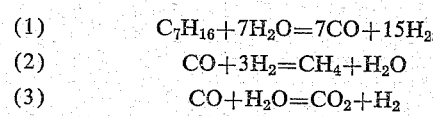

Reactions (2) and (3) do not proceed to completion in either direction but tend to reach an equilibrium which depends upon the prevailing conditions. Where the feed hydrocarbon is completely converted, the net dry products are $CH_4$, $H_2$, CO and $CO_2$. The reactions may be carried out in externally heated tubes disposed in a furnace whereby the large heat requirement of the overall conversion reaction is met. For continuous operation, carbon formation and deposition on the catalyst must be avoided. In prior art methods, carbon formation is avoided by maintaining high gas outlet temperatures (1400–1500° F. or more) and providing large amounts of excess steam. As will be seen from reaction (2), the effect of a large excess of steam is to lower the methane content of the product gas. High gas outlet temperatures have the same effect. Thus, in the prior art method proposed by Milbourne and Spengler in U.S. 2,711,419, it is said that if the methane content of the product gas exceeds 8 percent, excessive carbon deposition on the catalyst usually results. Such a product gas cannot be used directly as a domestic heating gas since its methane content (and its heating value) are far too low. It has been proposed to subject the product gas to a second conversion step in the presence of a methanation catalyst under suitable conditions to drive reaction (2) to the right and thereby enhance the methane content. It has also been proposed to crack another portion of the liquid hydrocarbons non-catalytically to produce normally gaseous hydrocarbons of high heating value such that a blend of the product gas of low heating value and the cracked gas results in a domestic heating gas of acceptable heating value. Unfortunately, these prior art methods require two conversion steps and therefore involve relatively large capital and operating expenditures.

One object of the invention is to provide an improved method for converting naphtha to domestic heating gas.

Another object of the invention is to provide a method for converting naphtha to domestic heating gas in a single conversion step.

Another object of the invention is to provide a method for substantially avoiding carbon formation incident to the catalytic conversion of napththa with steam to domestic heating gas.

Another object of the invention is to provide a method for reducing steam consumption in the catalytic conversion of napththa with steam to domestic heating gas.

Another object of the invention is to reduce the external heating requirement for the catalytic conversion of napththa with steam to produce domestic heating gas.

Another object of the invention is to provide a method for avoiding the presence of normally liquid hydrocarbons in domestic heating gas produced by the catalytic conversion of napththa with steam.

Various other objects and advantages of the invention will be apparent to those skilled in the art from the following detailed discussion and description.

The above objects are accomplished in accordance with the invention by the method which comprises contacting naphtha and steam in the presence of a catalyst in an elongated conversion zone maintained at an outlet pressure of about 300 to about 1200 p.s.i.g. Naphtha is supplied to the conversion zone at a space velocity of about 400 to about 2150 volumes of naphtha expressed as volumes of methane equivalent at standard conditions per hour per volume of catalyst. A controlled amount of steam is supplied to the conversion zone to provide a steam-carbon ratio of at least 1.55 plus 0.00113 times the aforesaid space velocity but not more than about 4.0. At least the inlet end of the conversion zone is externally heated to obtain a fluid temperature at a point within the zone of at least about 1300° F. Under these conditions, the effluent gas from the conversion zone is free of normally liquid hydrocarbons and requires no further conversion prior to being used as domestic heating gas. In some cases the specific gravity of the effluent gas will be slightly higher than the specification for domestic heating gas. In such cases, it is preferred in accordance with the invention to remove a limited amount of carbon dioxide from the gas and thereby adjust it to the exact specification of domestic heating gas.

The capability of the above method for producing specification domestic heating gas in a single conversion step is attributable to maintaining the operating conditions including reactant feed rates within specific limits and carefully controlling these operating conditions in accordance with certain critical relationships which have been found. The required operating conditions and their interrelationships are best understood by reference to the accompanying drawings which are accurate graphical presentations of data.

FIGURE 1 presents a correlation between the space velocity of the naphtha and the minimum steam-carbon ratio necessary to avoid carbon formation (i.e., to achieve operability) at that space velocity. The space velocity is reported in terms of the volumes of naphtha expressed as volumes of methane equivalent at standard conditions per hour per volume of catalyst. Thus, the space velocity on the defined basis for 100 volumes of vaporized heptane feed (calculated at standard conditions) per hour per volume of catalyst is 700 since each mol or volume of heptane is equivalent in carbon content to 7 mols or volumes of methane. The steam-carbon ratio is the ratio of mols of steam supplied to the mols of organic carbon in the naphtha supplied, e.g., where 7 mols of steam are supplied for each mole of heptane supplied, the steam-carbon ratio is 1.0 since each mol of heptane contains 7 mols of organic carbon. The line defined in FIGURE 1 has been derived experimentally. It has been found that carbon is formed and the conversion zone tends to become plugged where conditions falling below the line are used. Conditions falling above the line are found to be operable in the sense that substantially no carbon accumulates in the conversion zone. Thus, it is found that at a given space velocity, at least a certain minimum steam-carbon ratio must be used for operability even though all other conditions are biased in a direction to prevent carbon formation. It had been thought that with a given feed, catalyst, outlet gas temperature and pressure, only the steam-carbon ratio would affect operability, regardless of space velocity. However, it will be noted that at an operable condition of steam-carbon ratio, space velocity, temperature and pressure with a given catalyst, a sufficient increase in the space velocity will result in an inoperable condition although all other variables are held constant. The reason for this phenomenon is not known.

FIGURE 2 presents a correlation between the steam-carbon ratio and the outlet pressure of the externally heated elongated catalytic conversion zone for producing a domestic heating gas having a heating value of 500 B.t.u./s.c.f. and a specific gravity of 0.5, the approximate specifications for domestic heating gas. The temperature at which the gas at the outlet of the conversion zone is at equilibrium influences the conditions of steam-carbon ratio and pressure required and is therefore shown as a parameter. The equilibrium referred to is the steam-methane equilibrium or that of reaction (2), the constants for which are known. It will be seen that as pressure is decreased at a given equilibrium temperature, the steam-carbon ratio which can be used to make the specification domestic heating gas declines. The same effect is evident from reaction (2) where a reduction in pressure will be seen to drive the reaction in the direction of volume expansion (to the left) while a reduction in steam-carbon ratio will be seen to drive it in the direction of forming steam (to the right). Again with reference to FIGURE 2, note that at a given pressure, higher steam-carbon ratios will require maintenance of lower outlet temperatures to achieve specification domestic heating gas.

FIGURE 3 presents a correlation between the actual gas outlet temperature and the equilibrium temperature of the gas. These data were obtained experimentally and reflect the actual performance of the conversion zone. In practice, it is found that in every case the composition of the effluent gas from the conversion zone at a given outlet temperature differs somewhat from the composition which would obtain were the gas in equilibrium at that temperature. The extent of this difference is apparent by noting the spread between the operating line and the 45-degree line shown in FIGURE 3. Thus, in order to obtain a gas having a composition corresponding to a given equilibrium temperature, the actual gas temperature must be somewhat lower than such equilibrium temperature. Note also in FIGURE 3 that the operating line approaches the horizontal at low actual gas outlet temperatures. Therefore, there is little reduction in the equilibrium temperature of about 1200° F. obtainable by maintaining increasingly lower actual gas outlet temperatures below about 1000° F. That is, the gas composition corresponding to an equilibrium temperature of about 1200° F. is only slightly affected by reducing actual gas outlet temperatures below about 1000° F.

The operating conditions which are maintained in the conversion zone include a minimum space velocity of about 400 on the defined basis and maximum outlet pressure of about 1200 p.s.i.g. These limitations are imposed primarily on economic grounds. It is considered economically impractical to design the conversion zone for outlet pressures above about 1200 p.s.i.g. with present materials of construction and it is inefficient to operate the conversion zone at space velocities below about 400.

From FIGURE 1 it will be seen that the minimum steam-carbon ratio which can be used is about 2.0, corresponding to the minimum operable steam-carbon ratio at the minimum space velocity of about 400. The minimum pressure which can be used is about 300 p.s.i.g. as found from FIGURE 2, corresponding to the pressure at the minimum steam-carbon ratio of about 2.0 and an equilibrium gas temperature of about 1200° F. FIGURE 2 shows that at any steam-carbon ratio higher than about 2.0, a pressure higher than about 300 p.s.i.g. will be required at the same equilibrium gas temperature to make specification domestic heating gas. FIGURE 2 also shows that where an equilibrium gas temperature above about 1200° F. is used, the required pressure at the same steam-carbon ratio will be higher than about 300 p.s.i.g. Referring to FIGURE 3, it will be noted that the equilibrium gas temperaature cannot be reduced substantially below about 1200° F. without drastically lowering actual gas outlet temperature. Such drastic lowering would involve inefficient use of catalyst and is therefore impractical. Therefore, it is impractical to operate at lower pressures than about 300 p.s.i.g. by operating to achieve lower equilibrium gas temperatures. In general, it is preferred for most efficient operation to maintain the conversion zone at an outlet pressure of about 500 to about 1000 p.s.i.g.

The maximum steam-carbon ratio which can be used in the process of the invention is about 4.0 as seen from FIGURE 2, corresponding to the maximum pressure of about 1200 p.s.i.g. and the minimum equilibrium gas temperature of about 1200° F. If a steam-carbon ratio higher than about 4.0 is used, it will be seen from FIGURE 2 and reaction (2) that the methane content of the effluent gas at pressures of about 1200 p.s.i.g. or less will be too low for specification domestic heating gas and will therefore require the use of pressures above the maximum of about 1200 p.s.i.g. in order to meet the specification. Returning to FIGURE 1, it will be noted that while limiting steam-carbon ratios of about 2.0 to about 4.0 apply as shown above, the ratio used within that range must at least correspond to the minimum shown in FIGURE 1 at the prevailing space velocity. The relationship between space velocity and steam-carbon ratio shown in FIGURE 1 is linear and can be expressed mathematically. Including the relationship shown in FIGURE 1, the amount of steam which is used in the process of the invention corresponds to a steam-carbon ratio of at least 1.55 plus 0.00113 times the space velocity but not more than about 4.0. In practice, it will be desirable to provide some safety factor so as to avoid operating in the carbon formation range in the course of normal variations in the process. In general, it is preferred to operate at a steam-carbon ratio of at least about 0.5 greater than the minimum required for operability, subject to the same maximum steam-carbon ratio of about 4.0.

The maximum space velocity which can be used is about 2150 on the defined basis as seen from FIGURE 1, corresponding to the maximum steam-carbon ratio of about 4.0. In order to operate at any space velocity substantially above 2150, it would be necessary to employ a steam-carbon ratio above 4.0 to avoid carbon formation. Preferably, the space velocity used for most efficient operation is about 800 to about 1600.

The maximum equilibrium gas temperature which can be used is about 1400° F., corresponding to the maximum outlet pressure of about 1200 p.s.i.g. and the minimum steam-carbon ratio of about 2.0. At any higher steam-carbon ratio or at any lower pressure, the equilibrium gas temperature to make specification domestic heating gas would be less. The minimum equilibrium gas outlet temperature is, as stated before, about 1200° F. since lower equilibrium temperatures can be obtained only at the expense of inefficient use of catalyst.

The limits of actual gas outlet temperature can be seen from FIGURE 3 corresponding to the limits for equilibrium gas outlet temperature. Thus, a maximum actual gas outlet temperature of about 1390° F. corresponds to the maximum equilibrium gas temperature of about 1400° F. A minimum gas outlet temperature of about 1000° F. corresponds to the minimum equilibrium gas outlet temperature of about 1200° F.

It has been found that in order to avoid the presence of liquid hydrocarbons in the effluent from the conversion zone, it is essential that a temperature of at least about 1300° F. be reached by the gas in the conversion zone. If such minimum temperature is not reached, it is found that the product gas contains unreacted hydrocarbons from the feed or liquid reaction products derived from the feed. Additional expensive processing is required to remove liquid products so that it is important to avoid their formation in the first instance. Under the normally preferred operating conditions of space velocity, pressure and steam-carbon ratio, the actual gas outlet temperature which must be maintained in order to obtain specification domestic heating gas is substantially less than 1300° F. In all these cases, therefore, it is necessary to impose an artificial, hill-shaped temperature profile on the gas in the conversion zone with the temperature rising from the preheat temperature at the inlet to a point at or above 1300° F. at an intermediate point and then falling off to the actual gas outlet temperature substantially below 1300° F. The artificial profile can be imposed by confining the intense external heating done to the initial portions of the conversion zone. Means can also be provided for positively cooling the terminal portion of the conversion zone. The combination of these methods is preferred since it permits better control of temperature. In a tubular furnace, the provision of shielding means at an intermediate point along the length of the tubes will permit intense heating of the inlet portions of the tubes and circulation of relatively cooler gas over the outlet portions of the tubes, whereby the artificial temperature profile is achieved.

The feed hydrocarbon which is supplied to the conversion zone is naphtha. The term "naphtha" as used herein is intended to include light naphthas and heavy naphthas, ranging in average molecular weight from about 70 to about 170, or any fraction thereof. Naphthas may include aromatic, paraffinic and/or naphthenic hydrocarbons ranging from $C_5$ hydrocarbons up to heavier hydrocarbons boiling at a maximum end point of about 550° F. A typical naphtha feed may have a boiling range of about 100 to about 330° F. The feed naphtha should be free or substantially free of sulfur, i.e., its sulfur content should be less than about 10 p.p.m., preferably less than about 5 p.p.m. Where sulfur is present in excessive amounts, the life of the catalyst may be reduced through poisoning and it may be difficult to obtain complete conversion of the feed naphtha to gaseous products or to obtain the necessary close approach to the steam-methane equilibrium.

The feed naphtha is vaporized prior to its introduction into the conversion zone. Both the feed naphtha and steam are preheated, preferably to a temperature of about 700 to about 1100° F. Care must be taken to avoid excessive preheat of the naphtha whereby cracking and carbon formation in the preheating equipment takes place.

The process is carried out in the presence of a catalyst for the steam-hydrocarbon reaction. Any catalyst can be used which is capable of promoting the carbon-free steam reforming of naphtha at the relatively low prevailing steam-carbon ratios (not greater than about 4.0) which are used in the process. Some available reforming catalysts require the use of steam-carbon ratios of about 4.0 or more for the carbon-free reforming of naphtha, regardless of the space velocity used, and such catalysts cannot therefore be used alone in the process of the invention. In general, catalysts which are preferred for use in the process are alkalized catalysts comprising nickel and a refractory material. Nickel is present as the element and/or as a compound of nickel, such as nickel oxide. The nickel content of the catalyst may range between about 4 and about 40 weight percent based on the total weight of the catalyst. High nickel catalysts are usually preferred, for example, those containing between about 10 and about 30 weight percent. The catalyst is alkalized by incorporation of an alkaline metal compound. That term is intended to include both alkali metal and alkaline earth metal (including magnesium) compounds. Alkali metal compounds including those of sodium, lithium and potassium are preferred. Typical examples of such compounds are the alkali metal salts of oxygen-containing acids such as the carbonates, bicarbonates, nitrates, sulfates, silicates, oxalates and acetates of sodium, potassium and lithium; the alkali metal oxides or alkali metal salts capable of yielding the oxides at elevated temperatures including the aforesaid salts; as well as the alkali metal hydroxides. Particularly efficacious catalysts are those to which one or more alkali metal carbonates or hydroxides has been added, especially sodium carbonate, sodium hydroxide or their admixtures. The catalysts are prepared so as to provide a concentration of added alkaline metal compound of at least 0.5 weight percent calculated as the metal, preferably at least 2.0 weight percent. The concentration of added alkaline metal compound may be as high as 30 weight percent, and usually an amount below 20 weight percent calculated as the metal, is employed.

The remainder of the catalyst charge is a porous refractory material capable of maintaining high mechanical strength and possessing steam and high temperature stability. Thus, for example, this component of the catalyst may be various non-reducible or difficultly reducible inorganic oxides such as alumino-silicates, calcium silicates, silica, zirconia, magnesia, alumina such as alpha-alumina or a form which converts to alpha-alumina under the process operating conditions, and various admixtures thereof as well as in combination with other inorganic oxides. Examples of refractory materials of the latter type are porous refractory brick and cements including chrome and hydraulic cements, which usually contain various inorganic oxides such as magnesia, calcium oxide, etc., as binding agents, combined with silica and/or alumina.

The foregoing catalysts may be prepared by any of a variety of methods. One method comprises depositing nickel oxide on the refractory support or carrier material by soaking the support with a solution of a nickel precursor compound such as nickel nitrate, nickel carbonate or nickel sulfate, or by forming a slurry of the support and nickel salt and agitating, or by spraying the nickel salt solution on the support. The catalyst may then be dried and/or calcined, followed by addition of the alkaline metal compound usually in the form of a solution, by an impregnation or soaking technique, and then dried and/or calcined. Another method comprises depositing the alkaline metal compound on the refractory support, followed by addition of the nickel salt to the dried and/or calcined composite. Alternatively, the catalysts may be prepared by simultaneous addition of the nickel and alkaline metal compound to the support.

In addition to the above methods, the catalysts employed in the process may be prepared by impregnation or incorporation of the alkaline metal salt in the form of a solution, slurry or solid into a mixture comprising nickel compounded with the support. The catalysts also may be prepared by admixing the three principal components in the dry or moist state in the desired proportions, forming into a pellet and calcining.

When the precursor of the nickel and/or alkaline metal compounds are added in the form of a solution, intermediate or final drying steps may be employed to remove the solvent such as water and are usually conducted at a temperature between about 200° and about 400° F. for between about 2 and about 30 hours. Those methods which employ a nickel salt include an intermediate or final calcination step to convert the nickel salt to nickel oxide or nickel or mixtures thereof. Calcination may be effected at a temperature between about 800° and about 1700° F., more usually at a temperature below 1200° F., in the presence of air, nitrogen, or reducing gas for between about 2 and about 36 hours. Heat treatment of the catalyst at temperatures above those ordinarily employed for calcination has a beneficial effect on the catalyst. Thus, instead of (or in addition to) the usual calcination treatment, the catalyst may be heat treated at a temperature between about 1200° F. and about 2000° F. for between about 1 and about 36 hours.

The following examples illustrate the experimental basis by which FIGURES 1 and 3 were derived and some preferred ways in which the correlations presented are applied.

EXAMPLE I

Experiments were made in a commercially available bench-scale resistance furnace having a bore or reactor well about 2½ inches in diameter, the walls of which are adapted to be resistance heated in sections. The reactor well contained a 1 inch I.D. by a 60 inch long Inconel reactor divided into an upper inlet preheat zone and a lower outlet reaction zone containing about 425 milliliters (30-inch bed) of catalyst. An alkalized catalyst comprising nickel and a refractory material was used. The catalyst was of 4-8 mesh size and contained 6.43 weight percent sodium and 23.5 weight percent nickel.

Hydrocarbon liquid and water were separately metered through calibrated restriction tubes at a rate in accordance with a predetermined steam-carbon ratio and space velocity. The liquids were mixed, vaporized and introduced to the upper inlet preheating zone of the furnace. Heating of the vaporous mixture was controlled to give the predetermined preheat as sensed by thermocouples placed in the reactor tube and the furnace walls. The preheated vaporous mixture then passed in contact with the reforming catalyst in the lower outlet zone of the reactor well, the mixture being heated during its contact with the catalyst to maintain it at the desired temperatures, also as sensed by thermocouples placed in the reactor.

Product gases were cooled so as to condense unreacted water and separate the non-condensible gases. The condensed water was collected and weighed and the non-condensible gases were metered through a wet-test gas meter before being vented to atmosphere. Prior to metering, the non-condensed gases passed through a back-pressure regulator by means of which a predetermined pressure was maintained in the furnace. Samples of the non-condensible gases were taken and analyzed. Pressure drop across the catalyst bed was measured to give an indication of carbon formation as shown by a measurable change in the reactor pressure drop.

With this equipment and procedure, a series of runs was made on a desulfurized naphtha at a predetermined space velocity, starting at high steam-carbon ratio and gradually reducing the ratio in successive runs until carbon formation resulted. The series of runs were repeated at other space velocities. Each series of runs established a point on the line shown in FIGURE 1. Inspection data on the desulfurized naphtha feed are set forth in Table 1 below.

Table 1

NAPHTHA FEED INSPECTION

| | |
|---|---|
| API gravity | 62.4 |
| ASTM distillation: | |
| IBP, °F. | 154 |
| 5% | 201 |
| 10 | 211 |
| 20 | 223 |
| 30 | 233 |
| 40 | 240 |
| 50 | 247 |
| 60 | 251 |
| 70 | 256 |
| 80 | 261 |
| 90 | 268 |
| 95 | 275 |
| End point | 295 |
| Sulfur, p.p.m. | <3 |
| Bromine number | 0.0 |
| C/H weight ratio | 5.43 |
| Molecular weight | 109.4 |
| Assumed formula | $C_{7.7}H_{17.0}$ |

To illustrate, the following data are presented for the terminal runs in the series at a nominal space velocity of 800.

Table 2

| Run No. | 1 | 2 |
|---|---|---|
| Conditions: | | |
| Pressure, p.s.i.g. | 700 | 700 |
| $C_1$ Space Velocity, v./hr./v | 820 | 764 |
| Temperatures, °F.— | | |
| Max. Furnace | 1,325 | 1,305 |
| Inlet Fluid | [1] 900 | [1] 900 |
| Max. Fluid | 1,295 | 1,303 |
| Outlet Fluid | 1,205 | 1,177 |
| $H_2O/C_1$, mole ratio | 2.60 | 2.23 |
| ΔP Increase | No | Yes |
| Contact time, Secs. | 23.8 | 29.5 |
| Results: | | |
| Dry Product Gas, Mol Percent— | | |
| $H_2$ | 43.5 | 39.3 |
| CO | 4.6 | 4.3 |
| $CO_2$ | 19.4 | 19.5 |
| $CH_4$ | 32.5 | 36.9 |
| Water Gas Shift Equilibrium, °F. | 1,235 | 1,200 |
| Steam-Methane Equilibrium, °F. | 1,250 | 1,233 |
| HHV, B.t.u./s.c.f. | 485 | 515 |
| Gravity (air=1) | 0.55 | 0.57 |
| HHV at 0.5 grav. (by $CO_2$ removal) B.t.u./s.c.f. | 510 | 552 |

[1] Nominal.

From these data and the rate of increase in pressure drop in run 2 (not shown), the minimum operable steam-carbon ratio at a nominal 800 space velocity is seen to be about 2.4. The product of run 1 contained no hydrocarbons heavier than methane and required only minor adjustment of its specific gravity by $CO_2$ removal to provide a gas meeting all of the specifications for domestic heating gas in a single conversion stage.

EXAMPLE II

The data of which Example I is illustrative was also used to establish the operating line in FIGURE 3. Thus, for Run 1 of Example I, the outlet fluid temperature of 1205° F. resulted in a gas composition corresponding to the steam-methane equilibrium gas composition at 1250° F. These temperatures establish one point on FIGURE 3. The operating line was drawn based on a number of points similarly established.

EXAMPLE III

The same apparatus and operating procedure as were used in Example I were used to determine the conditions required to obtain complete conversion of the feed naphtha, i.e., to avoid the presence of normally liquid hydrocarbons in the product. In this case, the charge was a naphtha blend having a molecular weight of 108 and a distillation range of 150° F.–370° F. (assumed formula, $C_{7.7}H_{15.6}$). An alkalized catalyst comprising nickel and a refractory material was used. In this case, the catalyst was of 4–8 mesh size and contained 6.1 weight percent sodium and 23.6 weight percent nickel. A series of runs was made at an outlet pressure of 400 p.s.i.g., steam-carbon ratio of 3.0–3.5 and nominal $C_1$ spaced velocity of 500, during which maximum catalyst bed temperature was dropped from approximately 1600° F. to 1200° F. At a maximum catalyst bed temperature of 1392° F., no liquid hydrocarbon was present in the product, but at 1292° F., trace amounts of liquid were present. Further decrease in the maximum bed temperature led to increasingly larger amounts of liquid products and correspondingly smaller percentages of oil conversion. From these runs, it appears that a temperature of at least about 1300° F. must be reached in the course of the reaction to obtain complete conversion of the naphtha feed.

EXAMPLE IV

As illustrated by Run 1 of Example I, the product gas from the conversion unit may require some adjustment in specific gravity in order to meet the exact specification for domestic heating gas. This can readily be done by partial removal of $CO_2$. For example, for 100 mols of gas of the composition of the dry product gas from Run 1 of Example I, the removal of 3.2 mols of $CO_2$, i.e., less than 20% of that present, yields a gas having a specific gravity of 0.5 and the following composition:

Table 3

| Component: | Mol percent |
|---|---|
| $H_2$ | 45.0 |
| CO | 4.7 |
| $CO_2$ | 16.7 |
| $CH_4$ | 33.6 |
| | 100.0 |

The heating value of this gas is 510 B.t.u./s.c.f. Inspection of these data shows that all specifications are met: heating value is about 500, specific gravity is about 0.5, hydrogen content (burning velocity) is within the 45–50% range, and carbon monoxide content is less than 5 mol percent. It is unnecessary to enrich the gas with other hydrocarbons and it is unnecessary to subject the gas to methanation or shift conversion.

To further illustrate the manner in which the operating conditions are combined in accordance with the process of the invention in order to make a specification domestic heating gas in a single conversion stage, consider a case where a $C_1$ space velocity of about 1000 is selected for economic operation of the conversion zone. From FIGURE 1, it will be seen that a steam-carbon ratio of at least about 2.7 must be used for operability. The same minimum steam-carbon can be computed from the stated relationship of 1.55 plus 0.00113 times the space velocity, in this case 1000. In order to provide some safety factor, assume that a steam-carbon ratio of 3.2 is used. Assume that economic calculations show that a pressure of about 800 p.s.i.g. should be used. From these conditions and FIGURE 2, it is found that the equilibrium gas outlet temperature for a gas of 500 B.t.u./s.c.f. and 0.5 gravity is about 1210° F. Referring then to FIGURE 3, it will be seen that an actual gas outlet temperature of about 1070° F. is required. Since a temperature of at least about 1300° F. is necessary for complete conversion of the naphtha, it will be necessary to impose a hill-shaped temperature profile on the process gas in the conversion zone with a temperature of at least about 1300° F. at an intermediate point and a final temperature of about 1070° F.

As mentioned, the specific gravity of the product gas from the conversion zone can be reduced to the desired value by partial $CO_2$ removal. Any suitable $CO_2$-removal process can be used. Customarily, such processes involve contacting the gas with a regenerable absorbent, for example, aqueous solutions of an ethanolamine, which selectively absorbs $CO_2$ from the gas. Many processes for effecting selective removal of $CO_2$ from a gas of the nature described herein are known and therefore not further described.

The process of the invention has been described generally and by examples with reference to a domestic heating gas of a particular composition for purposes of clarity and illustration only. It will be apparent to those skilled in the art from the foregoing that the process disclosed herein can be used to prepare domestic heating gas of various compositions, without departure from the scope of the invention.

What is claimed is:

1. A method for producing domestic heating gas in one conversion step which comprises contacting naphtha and steam in the presence of steam reforming catalyst in an elongated conversion zone maintained at an outlet pressure of about 300 to about 1200 p.s.i.g., supplying the naphtha to said zone at a space velocity of about 400 to about 2150 volumes of naphtha expressed as methane equivalent at standard conditions per hour per volume of catalyst, supplying a controlled amount of steam to said zone to provide a steam-carbon ratio of at least 1.55 plus 0.00113 times said space velocity but not more than about 4.0, and externally heating at least the inlet end of said zone to obtain a fluid temperature at a point within said zone of at least about 1300° F. and an outlet fluid temperature lower than about 1390° F.

2. The method of claim 1 in which said steam reforming catalyst is an alkalized catalyst comprising nickel and a refractory material.

3. A method for producing domestic heating gas in one conversion step which comprises contacting naphtha and steam in the presence of steam reforming catalyst in an elongated conversion zone maintained at an outlet pressure of about 500 to about 1000 p.s.i.g., supplying the naphtha to said zone at a space velocity of about 800 to about 1600 volumes of naphtha expressed as methane equivalent at standard conditions per hour per volume of catalyst, supplying a controlled amount of steam to said zone to provide a steam-carbon ratio of at least 2.05 plus 0.00113 times said space velocity but not more than about 4.0, and externally heating at least the inlet end of said zone to obtain a fluid temperature at a point within said zone of at least about 1300° F. and an outlet fluid temperature lower than about 1390° F.

4. The method of claim 3 in which said steam reforming catalyst is an alkalized catalyst comprising nickel and a refractory material.

5. A method for producing domestic heating gas in one conversion step which comprises preheating naphtha to a temperature of about 700° F. to about 1100° F., contacting said preheated naphtha and steam in the presence of steam reforming catalyst in an elongated conversion zone maintained at an outlet pressure of about 300 to about 1200 p.s.i.g., supplying the preheated naphtha to said zone at a space velocity of about 400 to about 2150 volumes of naphtha expressed as methane equivalent at standard conditions per hour per volume of catalyst, supplying a controlled amount of steam to said zone to provide a steam-carbon ratio of at least 1.55 plus 0.00113 times said space velocity but not more than about 4.0, externally heating the inlet end of said zone to obtain a fluid temperature at an intermediate point within said zone of at least about 1300° F., and permitting the fluid temperature to decrease to substantially below 1300° F. at the outlet of said zone.

6. The method of claim 5 which further comprises positively cooling the terminal portion of said conversion zone.

7. The method of claim 5 in which said steam reforming catalyst is an alkalized catalyst comprising nickel and a refractory material.

8. The method of claim 6 in which said steam reforming catalyst is an alkalized catalyst comprising nickel and a refractory material.

References Cited by the Examiner

UNITED STATES PATENTS

| | | | |
|---|---|---|---|
| 1,834,115 | 12/31 | Williams | 23—212 |
| 2,622,089 | 12/52 | Mayland. | |
| 2,628,890 | 2/53 | Shapleigh | 23—212 |
| 2,671,718 | 3/54 | De Coriolis | 48—196 |

FOREIGN PATENTS 880,108  10/61  Great Britain.

MORRIS O. WOLK, *Primary Examiner.*